US009943999B2

(12) United States Patent
Hannecart

(10) Patent No.: US 9,943,999 B2
(45) Date of Patent: Apr. 17, 2018

(54) PROVISIONAL RETENTION OF METAL SHEET ON A MOLD BY MICROWELDS

(71) Applicant: Techspace Aero S.A., Herstal (Milmort) (BE)

(72) Inventor: Benoit Hannecart, Herve (BE)

(73) Assignee: SAFRAN AERO BOOSTERS SA, Herstal (Milmort) (BE)

( * ) Notice: Subject to any disclaimer, the term of this patent is extended or adjusted under 35 U.S.C. 154(b) by 701 days.

(21) Appl. No.: 14/478,152

(22) Filed: Sep. 5, 2014

(65) Prior Publication Data
US 2015/0069657 A1 Mar. 12, 2015

(30) Foreign Application Priority Data
Sep. 6, 2013 (EP) .................... 13183410

(51) Int. Cl.
B29C 45/14 (2006.01)
B29C 45/00 (2006.01)
B29C 70/78 (2006.01)
B29C 33/14 (2006.01)
B29K 101/00 (2006.01)
B29K 307/04 (2006.01)
(Continued)

(52) U.S. Cl.
CPC .......... B29C 45/0081 (2013.01); B29C 70/78 (2013.01); B29C 33/14 (2013.01); B29K 2101/00 (2013.01); B29K 2307/04 (2013.01); B29K 2309/08 (2013.01); B29L 2009/00 (2013.01); B29L 2031/7504 (2013.01)

(58) Field of Classification Search
CPC ..... B29C 45/0081; B29C 70/78; B29C 33/14; B29C 45/14065; B29C 45/1418; B29C 2045/14114; B29L 2031/7504; B29L 2009/00; B29K 2101/00; B29K 2309/08; B29K 2307/04
See application file for complete search history.

(56) References Cited

U.S. PATENT DOCUMENTS

| 4,342,549 A * | 8/1982 | Lemelson .................. B07C 5/34 249/102 |
| 2003/0124952 A1* | 7/2003 | Marine ..................... A63H 3/36 446/385 |
| 2008/0292851 A1* | 11/2008 | Egerer .................... B29C 43/18 428/196 |

FOREIGN PATENT DOCUMENTS

| DE | 102008031814 B3 | 1/2010 |
| EP | 0936045 A1 | 8/1999 |
| EP | 2418387 A1 | 2/2012 |

OTHER PUBLICATIONS

Search Report dated May 21, 2014 from corresponding European Patent Application No. 13183410.3.

* cited by examiner

Primary Examiner — Galen H Hauth
(74) Attorney, Agent, or Firm — James E. Walton

(57) ABSTRACT

The present application relates to a method of injection molding a resin such as a RTM mold. The method enables to manufacture a composite part comprising a resin body and a sheet or strip, forming a surface of the composite part. The composite part can be an annular compressor casing of an axial turbomachine, with a composite annular wall. The method includes the steps of: (a) placing and holding the sheet against a mold surface by fastening means such as welds or microwelds; (b) injection and solidification of the resin in the mold so as to form the body by binding it to the sheet; (c) release of the sheet by the fastening means when
(Continued)

a release force is exerted on the composite and release part of the composite part.

19 Claims, 5 Drawing Sheets

(51) Int. Cl.
*B29K 309/08* (2006.01)
*B29L 9/00* (2006.01)
*B29L 31/00* (2006.01)

PROVISIONAL RETENTION OF METAL SHEET ON A MOLD BY MICROWELDS

This application claims priority under 35 U.S.C. § 119 to European Patent Application No. 13183410.3, filed 6 Sep. 2013, titled "Provisional Retention of Metal Sheet on a Mold by Microwelds," which is incorporated herein by reference for all purposes.

BACKGROUND

1. Field of the Application

The present application relates to a method of resin injection molding. More particularly, the present application relates to a method of molding a composite part with a metal sheet forming a surface of the composite component which is injection molded. The present application also relates to a composite molded casing of a turbomachine compressor according to the present application.

2. Description of Related Art

The weight of an axial turbomachine, in particular in an aircraft, must be reduced. To achieve this goal, it is necessary to reduce the weight of its casing. The reduction is possible by using composite materials for producing, for example, an outer casing of the compressor. However, such an outer casing may have a metal insert, for example a strip which serves as a gripping surface for an annular layer of abradable material. This is beneficial because the adhesion of an abradable layer is better on a metal than on a composite material.

It is known from document EP2418387A1 a compressor casing of an axial turbomachine. The casing comprises a composite wall with a metal strip applied on the inner surface of the casing. The composite wall is formed from a preform disposed in a mold where it receives an injected resin in a RTM process. The strip is attached to the composite wall after molding by using glue. This embodiment of a compressor casing is used to link a composite casing and a metal strip. However, the positioning of the strip in the housing is complicated due to the curved shape of the casing.

To simplify the implementation of the strip, it is known to those skilled in the art to position the strip against a mold surface and then to dispose above the preform of the composite part. The strip is held by the preform which is itself locked in position by the mold when it is closed. However, the pressure of the injected resin can move and deform the preform. Therefore, the strip can move substantially and can no longer occupy its predetermined place.

Although great strides have been made in the area of injection molding, many shortcomings remain.

DETAILED DESCRIPTION OF THE PREFERRED EMBODIMENT

Figure 1:
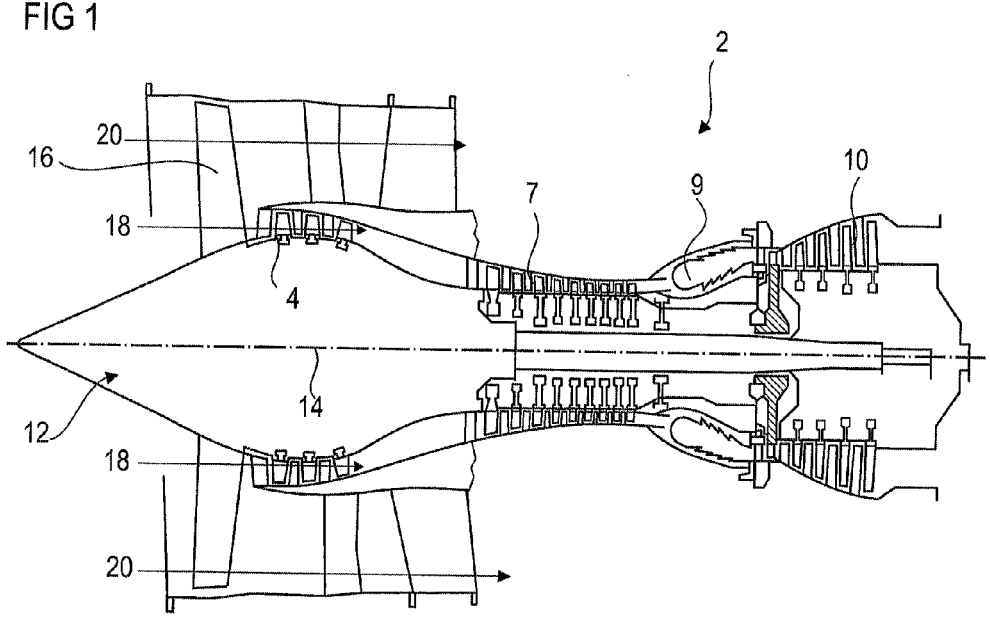
FIG. 1 shows an axial turbomachine according to the present application.

The present application aims to solve at least one of the problems raised by the prior art. More particularly, the present application aims to improve the retention of a strip in an injection mold.

The present application relates to a method of manufacturing a composite part comprising a resin body and a metal sheet forming a surface of said part, the method comprising the steps of: (a) placing the sheet against a surface of a mold; (b) injection and solidification of the resin in the mold so as to form the body by binding it to the metal sheet; (c) removing the composite part; remarkable in that step (a) comprises fastening the sheet on the mold surface with fastening means configured to hold the sheet during step (b), and for releasing the sheet during step (c) when a force to release the composite part is applied.

According to an advantageous embodiment of the present application, the fastening means comprise one or more of the following: welding, microwelding, electric resistance welding, soldering, gluing, stapling, screwing.

According to an advantageous embodiment of the present application, the fastening means are configured for releasing the sheet, preferably by breaking said means, when a force comprised between 100 N/m² and 10,000 N/m² of sheet is applied to the sheet in the mold releasing direction.

According to an advantageous embodiment of the present application, the fastening means are configured such that the fastening of the sheet to the mold surface is weaker than with the body after solidification of the resin.

According to an advantageous embodiment of the present application, the sheet of step (a) is initially generally flat and flexible and is bent on the surface of the incurved or cambered mold.

According to an advantageous embodiment of the present application, prior to step (b), the method comprises a step (b–3) prior to step (b) of introduction of a fiber preform in the mold that covers the sheet, the preform preferably extending in the majority volume of the body of the composite part.

According to an advantageous embodiment of the present application, the method comprises a step (b–1) between the step (b–3) and step (b), during which the preform presses the sheet against the surface of mold, optionally the preform deforming the sheet and applying it to a greater extent against the mold surface.

According to an advantageous embodiment of the present application, the fiber preform comprises a stack of fibrous plies, the plies being preferably woven.

According to an advantageous embodiment of the present application, the fiber preform comprises carbon fibers and/or glass fibers, the preform being preferably pre-impregnated with a resin.

According to an advantageous embodiment of the present application, the sheet comprises a strip shape with a main extension axis; the fastening means being distributed parallel to the main extension.

According to an advantageous embodiment of the present application, each fastening means comprises an general diameter comprised between 0.001 mm and 20.00 mm, preferably between 0.005 mm and 2.00 mm, more preferably between 0.010 mm and 0.05 mm.

According to an advantageous embodiment of the present application, the composite part is an annular outer casing, among others of an axial compressor, with an internal annular surface, the sheet being an annular sheet applied against the internal annular surface, the sheet being optionally shaped so as to be arched.

According to an advantageous embodiment of the present application, the internal annular surface has a varying radius, the sheet comprises a plurality of perforations or cut-outs distributed over its surface so as to increase its ability to conform to the inner surface.

According to an advantageous embodiment of the present application, the annular casing is formed by annular casing halves separated by an axially extending plane, said plane optionally also separating the sheet, preferably the casing halves comprise annular flanges and axial flanges extending radially.

According to an advantageous embodiment of the present application, the sheet is covered with a layer of abradable material adapted to cooperate by abrasion with the ends of the rotor blades so as to provide a seal.

According to an advantageous embodiment of the present application, the sheet is metallic, optionally the sheet comprises steel, aluminum, titanium, copper, and/or an alloy of at least one of these materials.

According to an advantageous embodiment of the present application, the sheet is a metal foil or a metal tape.

According to an advantageous embodiment of the present application, the fastening means form at least one fastening zone, preferably several fastening zones spaced from each other.

According to an advantageous embodiment of the present application, the fastening zones comprise at least one, preferably several fastening points.

According to an advantageous embodiment of the present application, each fastening zone and/or each fastening point has a tensile strength and/or a shear strength that is less than 500 N, preferably less than 10 N, more preferably less than 0.1 N.

According to an advantageous embodiment of the present application, each fastening zone has a resilience of less than 1,000 J, preferably less than 100 J, more preferably less than 10 J, optionally less than 1 J.

According to an advantageous embodiment of the present application, the sheet is annular and has in an axial direction a variation of diameter greater than 1%, preferably greater than 3%.

According to an advantageous embodiment of the present application, the mold is substantially rigid.

According to an advantageous embodiment of the present application, the sheet has a thickness less than 2.00 mm, preferably less than 0.50 mm, more preferably less than 0.10 mm.

According to an advantageous embodiment of the present application, during step (b), the injection is performed at a pressure between 1 bar and 15 bar.

According to an advantageous embodiment of the present application, the mold is adapted to be opened and closed.

According to an advantageous embodiment of the present application, the preform is compressed upon closure of the mold.

According to an advantageous embodiment of the present application, when the sheet is pressed against the metallic mold surface during step (b-1), it is preferably elastically deformed, more preferably mostly elastically, and optionally plastically.

The present application helps to simplify the holding of the sheet in the mold. Achieving a few spot welds may suffice, which only require a small expenditure. Furthermore, the method allows keeping accurate positioning of the sheet relative to the composite part.

In the following description, the terms internal or interior, and external or exterior refer to a position in relation to the axis of rotation of an axial turbomachine.

FIG. 1 schematically shows an axial turbomachine. It is in this case a double-flow turbojet. The turbojet 2 comprises a first compression level, designated low-pressure compressor 4, a second level of compression, designated high pressure compressor 7, a combustion chamber 9 and one or more stages of turbines 10. During operation, the mechanical power of the turbine 10 transmitted via the central shaft to the rotor 12 moves the two compressors 4 and 7. Means increasing the transmission ratio may increase the speed of rotation transmitted to the compressors. Alternatively, the various turbine stages may each be connected to compressor stages via concentric shafts. These include several rotor blade rows associated with stator blade rows. Rotation of the rotor about its axis of rotation 14 generates a flow of air and gradually compresses the latter until the entry of the combustion chamber 10.

An intake fan 16 is coupled to the fan rotor 12 and generates an air flow which is divided into a primary flow 18 passing through the different above mentioned stages of the turbomachine, and a secondary flow 20 through an annular conduit (shown in part) along the machine that then joins the primary flow at the turbine outlet. The primary flow 18 and secondary flow 20 are annular; they are guided by the casing of the turbomachine. For this purpose, the casing has cylindrical walls or ferrules which can be internal and external.

Figure 2:
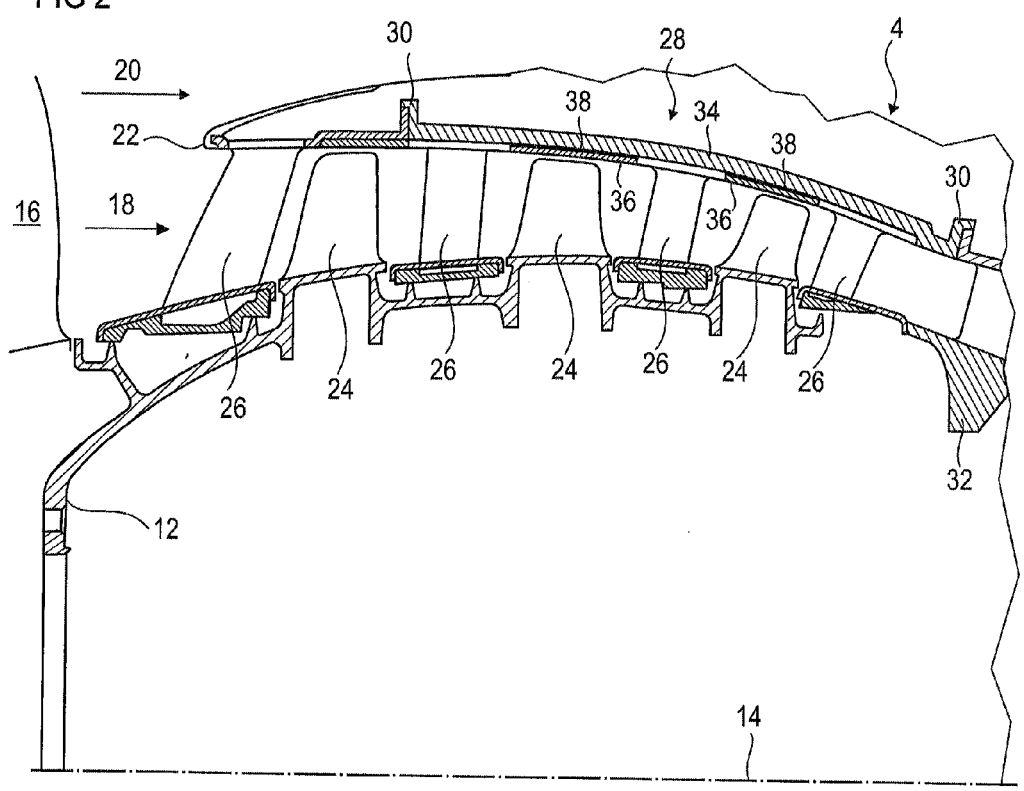
FIG. 2 is a diagram of a turbomachine compressor according to the present application.

FIG. 2 is a sectional view of an axial compressor of a turbomachine 2 as that of FIG. 1. The compressor may be a low-pressure compressor 4. One can observe a portion of the fan 16 and the separation nose 22 of the primary flow 18 and secondary flow 20. The rotor 12 comprises several rows of rotor blades 24, in this case three.

The low pressure compressor 4 includes a plurality of rectifiers, in this case four, which each contains a row of stator blades 26. Rectifiers are associated with the fan 16, or a row of rotor blades to straighten or rectify the flow of air, so as to convert the velocity of the flow into pressure.

The compressor includes at least one composite part 28 such as an outer casing 28. The composite part 28 can comprise annular flanges 30 for fastening the separating nose 22 and/or to fastening to an intermediate casing of the turbomachine 32. The annular flanges 30 can comprise mounting holes (not shown) to allow attachment by bolts or lockbolts. The composite part 28 has an annular shape, with a profile of revolution about the axis 14 of rotation of the turbomachine.

The composite part 28 includes a body which can optionally have the shape of an annular wall 34. The annular wall 34 has a bullet-shaped, with a variation of the radius along the axis 14. This variation of the radius can be reversed. The annular wall 34 has an inner surface with a double curvature, one of the curvature being along an axial plane, the other curvature being along a radial plane. It is understood that the radial plane is perpendicular to the axis 14, the axial plane extends axially and radially.

The annular wall 34 can have a series of mounting holes (not shown) for fixing the stator blades 26. Mounting holes may be provided with inserts (not shown) for reinforcing the composite material of the composite part 28. These inserts can be incorporated into the thickness of the annular wall 34 or flanges 30.

The composite part 28 can also be a support for annular abradable layers 36 which are arranged against the annular wall 34 and are intended to provide a seal with the outer ends of the rotor blades 24. The composite part 28 can comprise a composite material, for example with an organic matrix and carbon fibers.

To improve the adhesion of the abradable layer 36, the composite part 28 includes at least one, preferably several strips 38 also designated sheets 38, or ribbons 38, preferably metallic, which are interposed between each layer of abradable 36 and the composite part 28. They have annular shapes. The sheets 38 can extend axially over the majority of the abradable layer 36.

The composite part 28 can be a half-shell of the outer casing. It can form a portion of outer casing divided along a plane extending along the axis 14. To join the half-shells, the latter are provided with axial flanges to be fixed to each other.

According to the scope of the present application, the annular wall is an optional aspect. A sheet can be applied to any body of a composite part, e.g., a body forming a block of any material.

Figure 3:
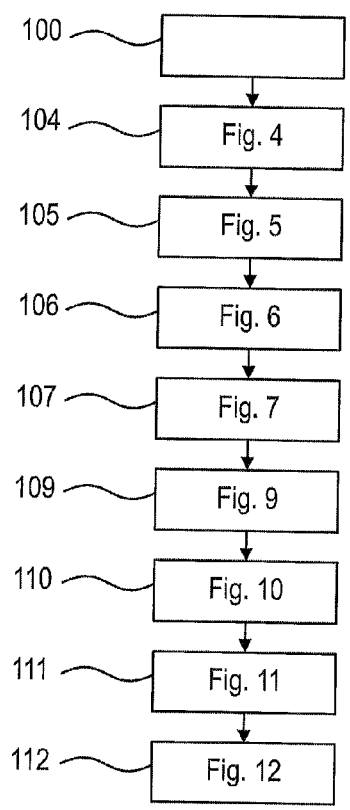
FIG. 3 is a diagram illustrating the molding process according to the present application.

FIG. 3 shows a diagram of the manufacturing process of the composite part comprising a resin body and a metal sheet forming a surface of said part. The composite part can be produced by a RTM process (Resin Transfer Molding), allowing transfer of a resin in a mold containing a preform.

The method can comprise the succession, possibly in that order, of the following steps:
- (a−1) supplying or manufacturing 100 of a sheet;
- (a) placing 104 at least partially the sheet against a surface of the mold;
- (a+1) fastening 105 the sheet on the mold surface using fastening means;
- (b−3) placing 106 a preform in the mold and against the sheet;
- (b−2) partially closing 107 the mold;
- (b−1) applying pressure on the sheet by the preform 109 during the complete closure of the mold;
- (b) injection and solidification 110 of a resin;
- (c1) releasing the sheet 111 from the fastening means;
- (c2) removing 112 the composite part from the mold.

The sheet provided or manufactured in the step (a−1) is substantially planar. The dimensions of the sheet can substantially correspond to the developed shape occupied by the sheet when the latter is integrated into the composite part. The sheet is mainly thin. Its thickness is less than 2.00 mm, preferably less than 0.20 mm. It is essentially flexible. By flexible is meant that the sheet can arch up so as to form at least one tenth of a circle, preferably a semi-circle, while deforming elastically. It is configured to be arched up, for example by forming a semicircle, and conform to the inner surface of the annular wall by deforming elastically. Step (a−1) can be a sub-step of step (a).

The sheet is substantially elongated and forms a strip with a length that is at least three times, preferably at least ten times larger than its width. It has opposed longitudinal edges extending along its main extension. The sheet can include cut-outs to increase its ability to deform and conform to the surface of the metal mold.

Step (b−3) of placement 106 of the preform in the mold can be a step of supplying or manufacturing, and of placement 106 of the preform 106. The preform can be produced simultaneously with its placement.

Steps (c1) and (c2) can be sub-steps of a step (c) of removing the composite part, which is optionally a global step.

Figure 4:
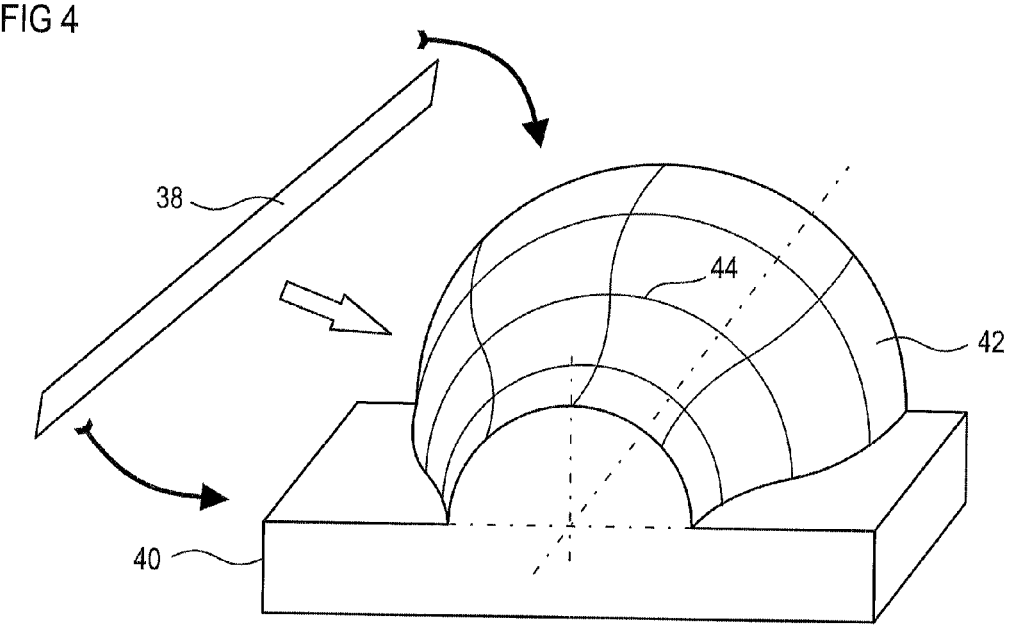
FIG. 4 shows the step of introduction of a sheet against a molding surface according to the present application.

FIG. 4 illustrates the step of (a) placement of the sheet against a surface 42 of the mold.

The mold comprises several mold portions, at least one of which being first mold portion 40. The mold portions are movable relative to each other. The sheet 38 is positioned against the first mold portion 40. The first mold portion 40 has a surface 42 or a molding surface 42 that forms at least a complementary portion of the inner surface of the annular wall. The surface 42 is incurved and/or cambered. It reproduces the curves in the axial and radial planes of the annular wall, as well as the changes in curvature. At least a portion of the surface 42 is metallic, said portion receiving the sheet 38. The first mold portion 40 can permit to manufacture a half-shell of the outer casing.

At least a portion of the sheet 38 is pressed against at least a portion of the surface 42 which is metallic. The sheet is arcuate along at least two directions. Its two ends are close to each other, the longitudinal edges can have different lengths. Preferably, these deformations are mainly elastic deformations. The contact zone between the sheet and the surface 42 can be a line of contact 44 extending along the sheet, distant from its edges; or follow the perimeter of the sheet. Optionally, the sheet 38 is pressed on its whole surface against the surface 42.

Figure 5:
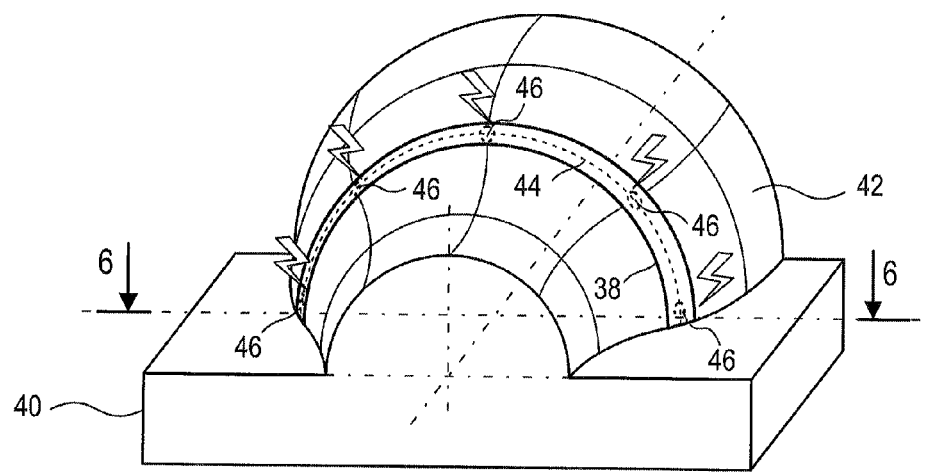
FIG. 5 shows the step of fixing the sheet on the mold surface according to the present application.

FIG. 5 shows the step of (a+1) of fastening 105 of the sheet on the mold surface. The step (a+1) can be an intermediate step of step (a).

In order to be held against the surface 42 the sheet 38 can be fastened thereto, e.g. temporarily using fastening means 46. Fastening means 46 can include one or more of the following: welding, microwelding, electrical resistance welding or spot welding, soldering, gluing, stapling, screwing. The fastening means 46 can be on the mold and/or on the sheet 38.

The fastening means 46 are formed at the contact zone. They can form at least one fastening zone, preferably several zones distant from each other and optionally distributed over the sheet. Each fastening zone can comprise one or more fastening points, for example spot welding. The fastening means can extend along one or more lines. The fastening zones can be distributed along a line, for example along the line of contact 44. The fastening means can form at least three fastening zone distributed along the sheet: one central zone and two lateral zones. The central zone can comprise two fastening points, for example spot welds, which are optionally spaced axially. The lateral zones can each include three fastening points, for example spot welds, which are arranged in a triangle. The spot welds are thus axially distributed axially to help pressing axially the sheet during its fastening. The fastening means 46 can include solder points and/or zones of welds. The welds 46 can be executed by friction and/or by points. The fastening means can have a diameter less than 2.00 mm, optionally less than 0.10 mm.

Welds, especially solders can be made with a filler material of the same nature as the surface of the metal mold and/or of the same nature as the sheet 38. Alternatively, the filler material, e.g. tin, can be different and can have a melting temperature below 800° C., preferably below 500° C. To perform the soldering, it is possible to dispose the solder against the sheet 38 or the surface 42 of the mold, and heating the filler metal through the sheet 38.

Although only one sheet is shown, it is naturally possible to press and to weld several sheets on the mold surface. The surface can be fully metallic or present several metallic mold surfaces, possibly axially separated from each other.

Steps (a) and (a+1) can be performed simultaneously, the sheet being fixed as it is put in place.

Figure 6:
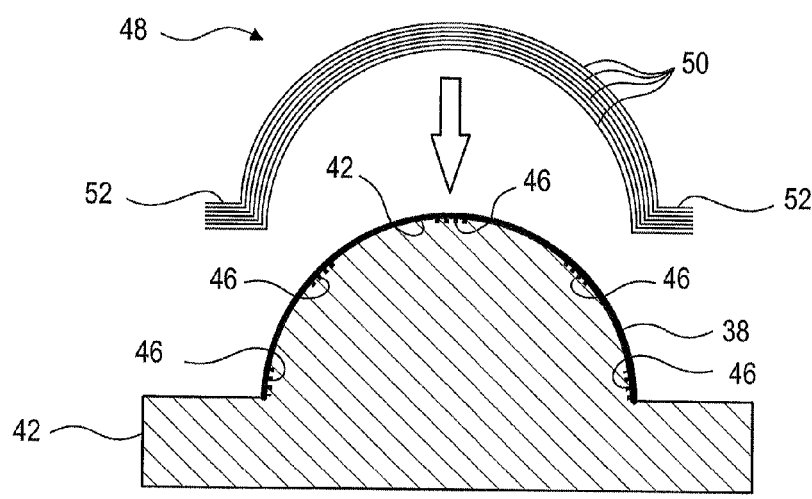
FIG. 6 is a sectional view along line 6-6 marked on FIG. 5 and represents the step of setting up a fiber preform against the molding surface according to the present application.

FIG. 6 is a sectional view along line 6-6 marked in FIG. 5. FIG. 6 shows step (b–3) of placing of a fibrous preform 48 against the surface 42 of the mold.

The fibrous preform 48 covers the weld 46, and optionally the whole sheet 38. It can cover the entire surface 42. It can be performed on a specific support, or be made by stacking or draping fibrous plies 50 on the surface 42. The preform 48 can include a combination of plies of different natures, for example with a woven or nonwoven structure, with carbon fibers or glass fibers. The fibers can be pre-impregnated.

The preform 48 can have shapes of axial flanges 52 and/or of radial flanges (not shown). It can include inserts for mounting holes.

It should be noted that step (b–3) is optional in the method according to the present application. Indeed, the composite part can be made using a fiber loaded resin. Alternatively, the composite part can have a body made of polymer resin, for example with essentially unfilled resin. This resin can adhere to the sheet and become one with the sheet, the whole forming a composite construction.

Figure 7:
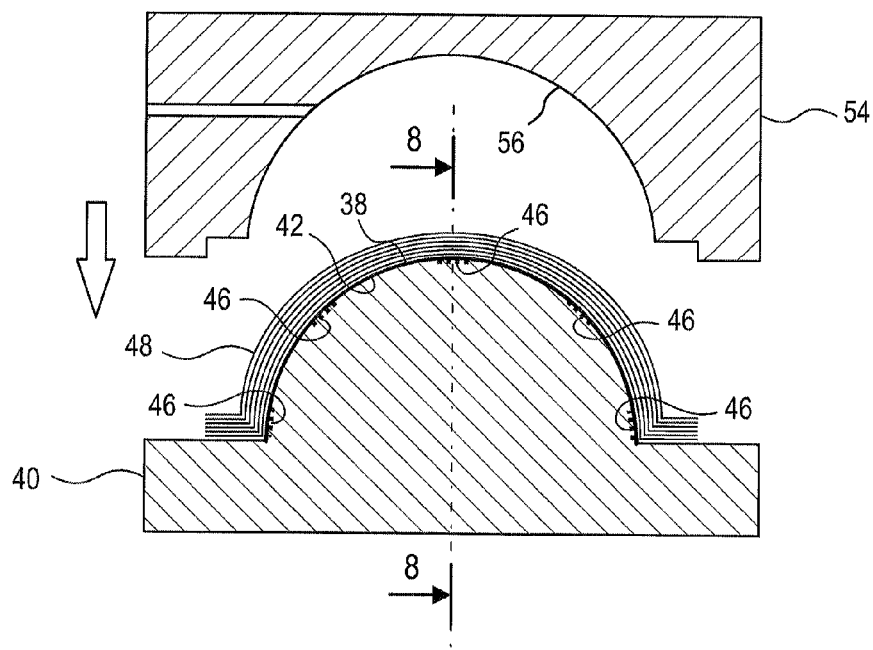
FIG. 7 shows the step of partially closing the mold according to the present application.

FIG. 7 shows the step (b–2) of partially closing the mold over the preform 48.

The mold can comprise a second portion of mold 54 or counter-mold 54. Mold portions comprise mold surfaces, which in combination define a substantially closed molding chamber. At least one of the mold surfaces is metallic; preferably all the mold surfaces are metallic.

The mold can have injection channels, possibly vents, for example with flaps. The mold can comprise heating means to achieve a desired temperature, for example to polymerize a resin.

The preform 48 is disposed on the first mold portion 40, or lower mold 40. The second mold portion 54, or upper mold 54, is arranged above the first mold portion 40. The second portion mold 54 is then brought close to the first mold portion 40 and of the preform 48 to come into contact with the latter.

The surface 42 of the mold is a first mold surface 42. The second mold portion 54 includes a second mold surface 56 which is generally complementary to the outer body surface of the composite part. The second mold surface 56 is generally similar to the first mold surface 42. The first mold surface 42 and the second mold surface 56 define a space encompassing the majority, preferably all of generally the composite part.

Figure 8:
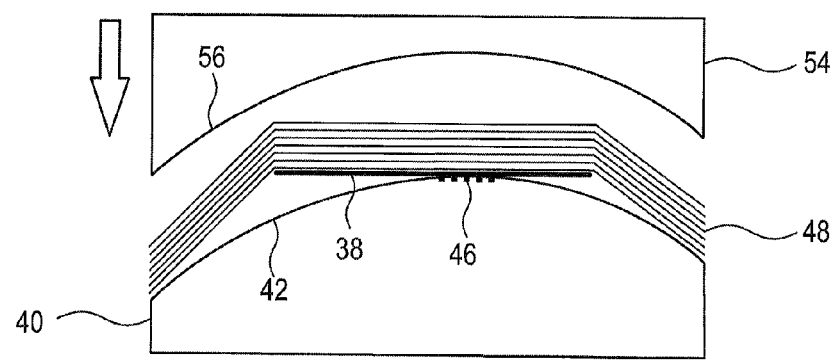
FIG. 8 shows a sectional view along the line 8-8 of FIG. 7.

FIG. 8 shows a sectional view along the line 8-8 marked on FIG. 7, a portion of the mold and a portion of the preform 48.

Viewed from the side, we see that the sheet 38 can stay locally raised with respect to the first molding surface 42, for example because of its stiffness and/or curvatures of the first mold surface 42. Optionally, the longitudinal edges of the sheet 38 can remain raised due to the weld.

The preform 48 is applied over the sheet 38 can remain locally remote from the first mold surface 42 and form raised areas. During the step of closing the mold, the second mold surface 56 comes into contact with the preform 48, in particular at its raised areas. The preform 48 and the stiffness of the plate 38 can oppose to the complete closure of the mold, and possibly block the total closure.

Figure 9:
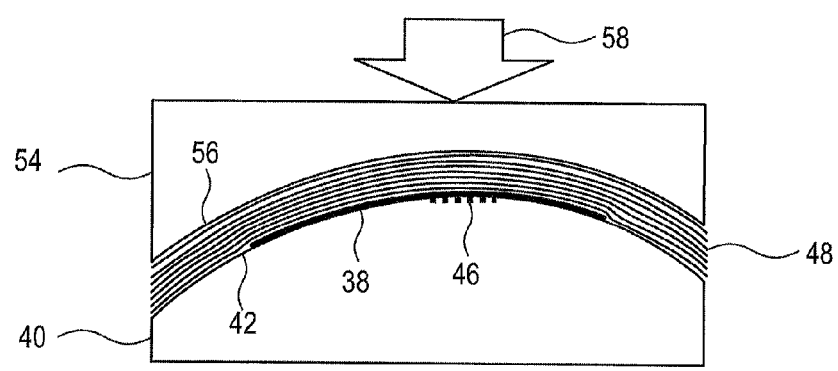
FIG. 9 illustrates the step of applying pressure on the sheet by the preform of the present application.

FIG. 9 sketches step (b–1) of applying pressure on the sheet 38 by the preform 48, or compression of the preform at the complete closure of the mold.

The total closure of the mold is forced, for example by means of an additional force that can be applied 58 to the second mold portion 54. Through this, the first mold portion 40 abuts against the second mold portion 54. The preform 48 which could be expanded before is then partially compacted. The thickness of the plies and/or voids between its plies can be reduced.

The areas of the preform which were raised because of the sheet 38 are folded back by the second mold surface 56. In turn, said areas of the preform exert a force against the sheet 38 and press it against the first mold surface 42. The entire surface of the sheet 38 can be generally pressed against the first mold surface 42. The sheet 38 is again deformed, preferably elastically. When closing the mold, the preform may be compacted, possibly beyond the areas overlying the sheet.

In this configuration, we note that the preform 48 and 46 welds complement to maintain and flatten the sheet 38. Thus, maintaining the sheet is optimal to meet its positioning requirements.

According to the present application, steps (b–2) and (b–1) can take place simultaneously, possibly progressively. Steps (b–3), (b–2) and (b–1) can belong to step (b) and be sub-steps thereof.

Figure 10:
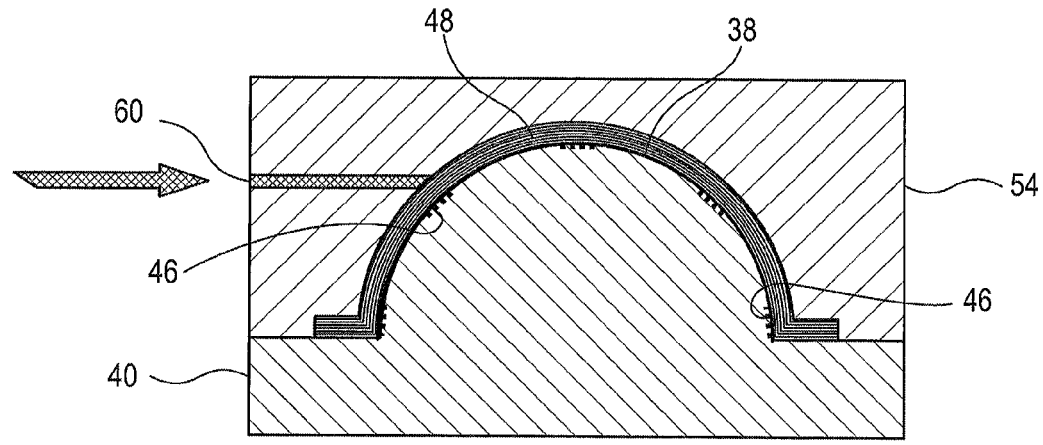
FIG. 10 represents the step of injecting and polymerizing a resin into the mold according to the present application.

FIG. 10 represents step (b) of injection and solidification of the resin in the mold.

The mold is closed, the preform 48 is compacted. It is densified by injecting a resin 60 under pressure through an injection channel. The resin 60 infiltrates into the whole preform 48, and fills in the voids so as to form the body. A suction can be applied to promote the spread of the resin. The mold temperature can be increased and maintained for a desired period, for example to improve impregnation.

Following step (b) of injection or impregnation, the resin solidifies. It can be polymerized or crosslinked. It may adhere to the sheet 38, so as to bind it to the body. The sheet can receive treatment to increase its cohesion with the resin.

According to the present application, the injection is not an essential aspect of the present application. Indeed, the preform can be pre-impregnated with a resin which solidifies, e.g. by heating, and adhering to the sheet. After solidification of the pre-impregnation resin, the sheet and the preform can form a mechanical solid.

After solidification, the composite part can be removed from the mold in step (c). The unmolding step can be carried out in several stages.

Figure 11:
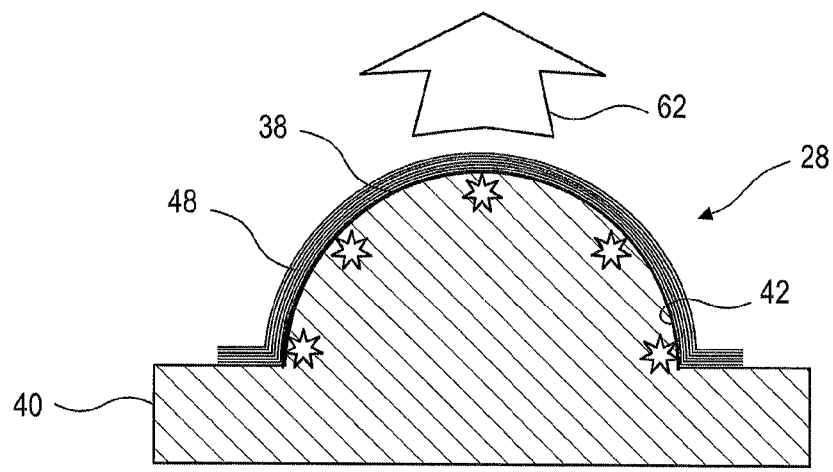
FIG. 11 shows the step of release of the sheet according to the present application.

FIG. 11 illustrates a first intermediate step (c1) of the unmolding step (c). The first step can be a step of releasing the sheet by the fastening means. Beforehand, the second mold portion has been removed.

After solidification of the resin, the composite part 28 is substantially formed. To extract the first mold portion 40, a mold release force 62 is applied thereto, for example in an unmolding direction. The unmolding direction can be the main mold opening direction, and/or perpendicular to the main plane of the sheet, and/or parallel to the axis of revolution of the sheet. This force can be exerted on the body or on the flanges. Unmolding force 62 can be a manual traction, and/or a mechanical pushing force exerted by means of an unmolding device. The unmolding device can comprise pistons disposed on the first mold portion and which are adapted to protrude from the first mold surface, and to retract. The unmolding device can exert an unmolding force 62 against the sheet 38, or optionally at a distance from the sheet.

The fastening means are configured to release the sheet under the effect of the unmolding force 62. The means can be configured to release the sheet when the unmolding force is comprised between 10 N/m$^2$ and 100,000 N/m$^2$, preferably between 500 and 5,000 N/m$^2$, and it is directed in an unmolding direction. An unmolding direction can be in the general plane of junction between the first mold portion and the second mold portion.

The fastening means such as welds, microwelds and the soldering, can be configured to break during step (c1). The fastening means can be configured to deform and release the sheet at the step (c1). A portion of the fastening means, such as solder residue, can remain on the mold surface after releasing the sheet. This part of the fastening means can optionally modify the surface of the mold, but this modification is acceptable since the surface in question becomes covered by another sheet in a subsequent molding. The mold is adapted to perform a series of more than 100 parts, preferably from 1,000 pieces, possibly without the need to correct the surface receiving the sheet.

The fastening means can be essentially fragile. Each fastening zone can break under a stress below 500 N, optionally below 1 N, and/or have a resilience of less than 2000 J, optionally less than 1 J. The fastening means can be loaded in tension and/or in shear. Thus, an abrupt manual effort can allow breaking the fastening means and unmolding the composite outer casing. A mechanical impulse, as a mallet blow may be sufficient to release the composite part 28.

Figure 12:
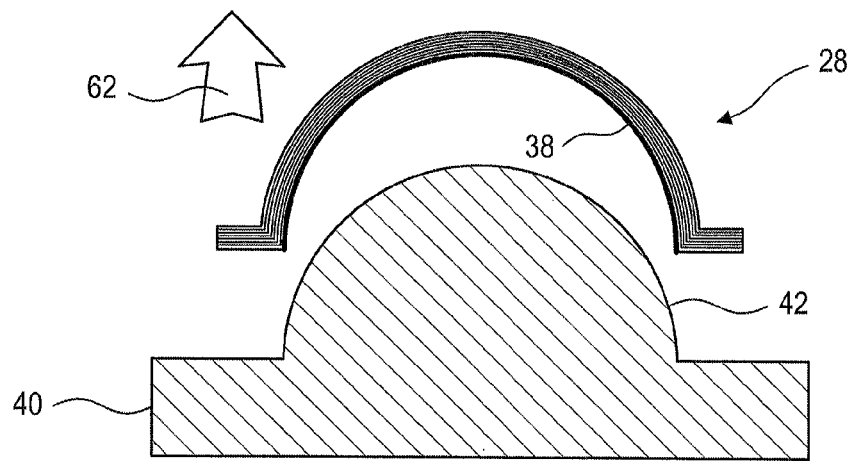
FIG. 12 diagrammatically shows the extraction of the composite mold part step of the present application.

FIG. 12 shows schematically step (c2) of removing the composite part 28 from the mold, which can correspond to the second step of unmolding step (c).

Following the release of the sheet by the fastening means, the composite part 28 is essentially detached from the first mold portion and can be extracted, for example through the unmolding effort 62. The part is taken to distance of the first mold portion 42. The unmolding effort 62 can be modulated according to the release of the fastening means.

Then, the composite part can comprise a step of depositing an annular layer of abradable material on the sheet. It may also follow a step of mounting stator blades. It can subsequently be mounted in a turbomachine.

According to one alternative of the present application, step (c1) of releasing the sheet from its holding means and step (c2) of extraction of the composite part can be made simultaneously, at once or gradually.

I claim:

1. A method of manufacturing a composite part, said composite part including:
   a resin body,
   a sheet,
   a surface formed by the sheet and the resin body,
   the method of manufacturing comprising the following steps:
   (a) placement of the sheet against a surface of a mold;
   (b) injection and solidification of the resin in the mold so as to form the body by binding it to the sheet; and
   (c) removing the composite part;
   wherein step (a) comprises:
   fastening the sheet on the surface of the mold with fastening means configured to hold the sheet during step (b), and for releasing the sheet at step (c) when a release force is exerted on the composite part said force exerted on the composite part breaking the fastening means,
   wherein the composite part is an annular outer casing with an internal annular surface, the sheet being an annular metal sheet forming partially the internal annular surface.

2. The method according to claim 1, wherein the fastening means comprises one or more of the following:
   welding;
   microwelding;
   electrical resistance welding;
   brazing;
   gluing;
   stapling; and
   screwing.

3. The method according to claim 1, wherein the fastening means are configured to release the sheet by breaking said fastening means when a force comprised between 100 N/m<2> and 10,000 N/m<2> of sheet is applied to the sheet in the releasing direction.

4. The method according to claim 1, wherein the fastening means are configured such that the fastening of the sheet to the surface of the mold is weaker than with the body after solidification of the resin.

5. The method according to claim 1, wherein the mold includes a surface which is incurved or cambered, and wherein the sheet of step (a) is initially generally flat and flexible and is bent on the incurved or cambered surface of the mold.

6. The method according to claim 1, wherein before step (b), the method comprises:
   a step (b–3) prior to step (b), of placing a fibrous preform into the mold overlying the sheet, such that the preform extends in the majority of the volume of body of the composite part.

7. The method according to claim 6, further comprising:
   a step (b–1) between the step (b–3) and step (b), during which the preform presses the sheet against the surface of the mold.

8. The method according to claim 6, wherein the fibrous preform comprises:
   a stack of fiber plies, the plies being optionally woven.

9. The method according to claim 6, wherein the fiber preform comprises:
   carbon fibers and/or glass fibers, the preform being optionally pre-impregnated by a resin.

10. The method according to claim 1, wherein the sheet comprises:
    a strip shape with a main extension axis, the fastening means forming a row along to the main extension axis.

11. The method according to claim 1, wherein the fastening means comprises:
    a general width between one of the following ranges:
    0.001 mm and 20.00 mm;
    0.005 mm and 2 mm; and
    0.010 mm and 0.05 mm.

12. The method according to claim 1, wherein the internal annular surface has a varying radius, the sheet comprising:
    a plurality of perforations distributed over the surface thereof.

13. The method according to claim 1, wherein the annular outer casing is an annular outer casing half bounded by an axially extending plane.

14. The method according to claim 13, wherein the annular outer casing half comprises annular flanges and axial flanges extending radially.

15. The method according to claim 1, wherein the composite part is an axial compressor annular outer casing.

16. The method according to claim 13, wherein it further comprises a step of applying an abradable sealing material against the annular metal sheet.

17. A method of manufacturing a composite part, said composite part including:
- a resin body,
- a sheet,
- a surface formed by the sheet and the resin body,
- the method of manufacturing comprising the following steps:
  - (a) placement of the sheet against a surface of a mold;
  - (b) injection and solidification of the resin in the mold so as to form the body by binding it to the sheet; and
  - (c) removing the composite part;
- wherein step (a) comprises:
- fastening the sheet on the surface of the mold with weldings configured to hold the sheet during step (b), and for releasing the sheet at step (c) when a release force is exerted on the composite part,
- wherein the composite part is an annular outer casing with an internal annular surface, and wherein the method further comprises a step of applying an abradable sealing material against the sheet.

18. The method according to claim 17, wherein at step (c) the welding forms a welding residue which remains on the mold surface after releasing the sheet.

19. A method of manufacturing a composite part, said composite part including:
- a resin body,
- a sheet,
- a surface formed by the sheet and the resin body,
- the method of manufacturing comprising the following steps:
  - (a) placement of the sheet against a surface of a mold;
  - (b) injection and solidification of the resin in the mold so as to form the body by binding it to the sheet; and
  - (c) removing the composite part;
- wherein step (a) comprises:
- fastening the sheet on the surface of the mold with gluing configured to hold the sheet during step (b), and for releasing the sheet at step (c) when a release force is exerted on the resin body remotely from the gluing,
- wherein the composite part is an annular outer casing with an internal annular surface, the sheet forming partially the internal annular surface.

\* \* \* \* \*